US012655036B1

(12) United States Patent
Meyer

(10) Patent No.: US 12,655,036 B1
(45) Date of Patent: Jun. 16, 2026

(54) SYSTEMS FOR GRIT REMOVAL

(71) Applicant: Scott Meyer, Genesee, ID (US)

(72) Inventor: Scott Meyer, Genesee, ID (US)

( * ) Notice: Subject to any disclaimer, the term of this patent is extended or adjusted under 35 U.S.C. 154(b) by 0 days.

(21) Appl. No.: 18/980,367

(22) Filed: Dec. 13, 2024

(51) Int. Cl.
| | |
|---|---|
| *B01D 21/00* | (2006.01) |
| *B01D 21/24* | (2006.01) |
| *B65G 33/00* | (2006.01) |
| *C02F 1/00* | (2023.01) |

(52) U.S. Cl.
CPC ........ *C02F 1/006* (2013.01); *C02F 2001/007* (2013.01); *C02F 2303/24* (2013.01)

(58) Field of Classification Search
CPC . C02F 1/006; C02F 2001/007; C02F 2303/24
USPC ........................................................ 210/767
See application file for complete search history.

(56) References Cited

U.S. PATENT DOCUMENTS

| | | | |
|---|---|---|---|
| 4,588,559 A | 5/1986 | Emmett | |
| 5,368,731 A | 11/1994 | Pesotini | |
| 5,904,850 A * | 5/1999 | Vellinga | B01D 21/0045 |
| | | | 210/603 |
| 6,505,743 B1 | 1/2003 | Bandis | |
| 9,611,635 B1 | 4/2017 | Pandya | |
| 9,770,722 B1 | 9/2017 | Sheker et al. | |
| 12,121,908 B2 | 10/2024 | Kinnear | |
| 2004/0211733 A1 | 10/2004 | Schloss | |
| 2013/0313348 A1 | 11/2013 | Keyssner | |
| 2017/0240465 A1 | 8/2017 | Stephansen | |

| | | | |
|---|---|---|---|
| 2019/0111440 A1 | 4/2019 | Theodoulou et al. | |
| 2021/0363745 A1 | 11/2021 | Deju et al. | |
| 2024/0091793 A1 | 3/2024 | Cain | |
| 2024/0115977 A1 | 4/2024 | Deju et al. | |

FOREIGN PATENT DOCUMENTS

GB          2261612 A   *   5/1993   ............... B03B 5/26

OTHER PUBLICATIONS

Huber Technology Inc., "Coanda Grit Classifier RoSF3", Oct. 23, 2024, published at www. huber-se.com/products/detail/huber-coanda-grit-classifier-rosf3/, copyright 2024.

(Continued)

*Primary Examiner* — Patrick Orme
*Assistant Examiner* — William Addison Geisbert
(74) *Attorney, Agent, or Firm* — Dale C. Barr; Constellation Law Group PLLC

(57) ABSTRACT

Systems for removing grit from a slurry are disclosed. In some embodiments, a system includes a containment vessel, a separation assembly, and a removal assembly. Grit is separated from the slurry by the separation assembly, which allows the grit to settle out of the slurry as the slurry flows through the containment vessel. The separation assembly is configured to enable the grit to be driven by gravity downwardly toward the bottom surface of the containment vessel and into engagement with a separation conveyor. The grit is conveyed by the separation conveyor to a removal conveyor of the removal assembly. The removal conveyor conveys the grit out of containment vessel and out of a grit exit port. An effluent formed by the slurry with at least some of the grit removed is released from an outlet of the containment vessel.

20 Claims, 8 Drawing Sheets

(56) References Cited

OTHER PUBLICATIONS

Lakeside Equipment Corporation, "Lakeside Grit Collection Systems", Oct. 23, 2024, published at www. https://www.lakeside-equipment.com/product tax/grit-collection/, copyright 2021.

Hydro-Dyne Engineering Inc., "Sand Shark Grit Removal Equipment," Oct. 23, 2024, published at www. hydro-dyne.com/products/sand-shark-grit-removal-systems/.

Smith & Loveless Inc., "Pista 360 with V-Force Baffle," Oct. 23, 2024, published at www. smithandloveless.com/products/complete-vortex-grit-removal-solutions-every-need/pista-360-v-force-baffle-vortex-grit.

Smith & Loveless Inc., "Pista Grit Removal System," Oct. 23, 2024, published at www. smithandloveless.com/products/ complete-vortex-grit-removal-solutions-every-need/pista-grit-removal-system.

Smith & Loveless Inc., "Pista VIO," Oct. 23, 2024, published at www.smithandloveless.com/products/complete-vortex-grit-removal-solutions-every-need/pista-vio-variable-inlet-outlet-vortex.

Smith & Loveless Inc., "Optiflow 270 Baffle System," Oct. 23, 2024, published at www.smithandloveless.com/products/complete-vortex-grit-removal-solutions-every-need/optiflow-270-baffle-system.

Smith & Loveless Inc., "Pista Works Complete Screening and Grit Removal All-in-One Package," Oct. 23, 2024, published at www. smithandloveless.com/sites/default/files/900 PistaWorks.pdf.

Smith & Loveless Inc., "Pista Pro-PAK Weather & Freezing Protection for Pista Turbo Grit Pump," Oct. 23, 2024, published at www. smithandloveless.com/sites/default/files/900_PistaProPak_2018_e.pdf.

Smith & Loveless Inc., "Pista Turbo Grit Pump for Maximum Grit Pumping Efficiency," Oct. 23, 2024, published at www. smithandloveless.com/sites/default/files/9503-9 PISTA TURBO Grit Pump e.pdf.

Smith & Loveless Inc., "Pista Turbo Grit Pump for Maximum Grit Pumping Efficiency," Oct. 23, 2024, published at www. smithandloveless.com/sites/default/files/976-pistaturbopump_fs_2018_with_sonic_start.pdf.

Smith & Loveless Inc., "Pista Turbo Grit Washer Provides Superior Grit Quality," Oct. 23, 2024, published at www. smithandloveless.com/sites/default/files/980-PistaTurboWasher_2018_e.pdf.

Smith & Loveless Inc., "Pista Grit Screw Conveyor Models 15 & 17," Oct. 23, 2024, published at www. smithandloveless.com/sites/default/files/9503-12-Screw%20Conveyor Models 14 17 e.pdf.

Smith & Loveless Inc., "State-of-the-Art S&L Touchscreen Headworks System Controls," Oct. 23, 2024, published at www. smithandloveless.com/sites/default/files/992 quicksmartpista 2018.pdf.

Smith & Loveless Inc., "Pista Grit Removal System—Innovation Timeline," Oct. 23, 2024, published at www. smithandloveless.com/news-articles/committed-rd-advancing-science-grit-removal.pdf.

Smith & Loveless Inc., "Pista—Simplified Sand Removal for Water Treatment Plant Intakes," Oct. 23, 2024, published at www. smithandloveless.com/sites/default/files/915%20PISTA_Water_Intake_WTP_e.pdf_0.pdf.

Smith & Loveless Inc., "Pista Duralyte Grit Concentrator: Durable, Efficient, Light Weight," Oct. 23, 2024, published at www. smithandloveless.com/sites/default/files/1 PISTA Grit Concentrator 0.pdf.

* cited by examiner

Fig. 7          Fig. 8

SYSTEMS FOR GRIT REMOVAL

FIELD OF THE DISCLOSURE

The present disclosure relates generally to wastewater treatment systems, and more specifically, to systems for removal of grit from a slurry.

BACKGROUND

Conventional wastewater treatment systems often include one or more devices designed to remove grit from an incoming stream of wastewater or other fluidic slurry. For example, it may be advantageous to remove particulates, sand, gravel, or other non-soluble materials (commonly referred to as grit), from the slurry prior to performing other treatment activities. A grating or bar screen is often used as an initial filtration mechanism, however, grit may typically pass through the initial filtration mechanism and may require additional effort for separation and removal.

For example, prior art grit removal systems may be equipped with some type of mechanical stirring device that creates vortices in the slurry, enabling the grit to be separated from the slurry under the influence of centrifugal forces. Such prior art systems consume energy to perform the desired stirring and may also require additional maintenance and repairs of the mechanical components that contribute to increased operational costs. Accordingly, although prior art grit removal systems provide desirable capabilities, there is room for improvement.

SUMMARY

The present disclosure is directed to systems for removal of grit from a slurry. Embodiments of systems in accordance with the present disclosure may advantageously perform the desired grit removal using less energy, and having less maintenance and repair costs, in comparison with prior art grit removal systems.

For example, in some embodiments, a system for removing grit from a slurry includes a containment vessel, a separation assembly, and a removal assembly. Grit is separated from the slurry by the separation assembly, which allows the grit to settle out of the slurry as the slurry flows through the containment vessel. The separation assembly is configured to enable the grit to be driven by gravity downwardly toward the bottom surface of the containment vessel and into engagement with a separation conveyor. The grit is conveyed by the separation conveyor to a removal conveyor of the removal assembly. The removal conveyor conveys the grit out of containment vessel and out of a grit exit port. An effluent formed by the slurry with at least some of the grit removed is released from an outlet of the containment vessel.

For example, in some embodiments, a system for removing grit from a slurry includes a containment vessel, a separation assembly, and a removal assembly. The containment vessel is configured to receive the slurry proximate a first portion thereof and having an outlet proximate a second portion thereof, the containment vessel having at least one bottom surface extending from the first portion to the second portion and being downwardly inclined at an inclination angle with respect to horizontal such that a grit that settles from the slurry moves downwardly along the at least one bottom surface.

The separation assembly is operatively coupled to the containment vessel, the separation assembly including: a separation conveyor having a first longitudinal axis extending from the first portion to the second portion, and a separation channel assembly at least partially disposed about the separation conveyor, the separation channel assembly being positioned to receive the grit that moves downwardly along the at least one bottom surface, the separation conveyor being configured to convey the grit in the separation channel assembly toward the second portion of the containment vessel and out of an end of the separation channel assembly; and one or more separation ribs positioned within the containment vessel and oriented approximately transversely to the first longitudinal axis of the separation conveyor, the one or more separation ribs being configured to slow a velocity of the slurry as the slurry traverses from the first portion to the second portion to encourage the grit within the slurry to settle out of the slurry toward the separation channel assembly for conveyance by the separation screw conveyor toward the second portion.

The removal assembly is operatively coupled to the containment vessel and to the separation assembly, the removal assembly having a lower portion and an upper portion having a grit exit port, the removal assembly including: a removal conveyor having a second longitudinal axis extending from the lower portion to the upper portion, and a removal chute at least partially disposed about the removal conveyor, the removal chute being positioned to receive the grit that is conveyed by the separation conveyor out of the end of the separation channel assembly, the removal conveyor being configured to convey the grit received by the removal chute toward the upper portion of the removal assembly and out of the grit exit port.

There has thus been outlined, rather broadly, some of the embodiments of the present disclosure in order that the detailed description thereof may be better understood, and in order that the present contribution to the art may be better appreciated. There are additional embodiments that will be described hereinafter and that will form the subject matter of the claims appended hereto. In this respect, before explaining at least one embodiment in detail, it is to be understood that the various embodiments are not limited in its application to the details of construction or to the arrangements of the components set forth in the following description or illustrated in the drawings. Also, it is to be understood that the phraseology and terminology employed herein are for the purpose of the description and should not be regarded as limiting.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evidence to the contrary from the description, where elements in different figures use identical reference numbers, the elements are generally either identical or at least similar in function or purpose.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein.

FIG. 7 is a side elevational view of a separation rib of the system of FIG. 1 in accordance with an example embodiment.

FIG. 8 is a front elevational view of the separation rib of FIG. 7 in accordance with an example embodiment.

DETAILED DESCRIPTION

Embodiments of systems for grit removal and classification are described herein. Many specific details of certain embodiments are set forth in the following description and in FIGS. 1-15 to provide a thorough understanding of such embodiments. One skilled in the art will understand, however, that the invention may have additional embodiments, or that alternate embodiments may be practiced without several of the details described in the following description.

In various embodiments, systems for grit removal in accordance with the present disclosure may be used for processing of wastewater from food processing plants, from grain processing plants, from wineries and breweries, from sewage systems, from septic tank pumping trucks, from mines, including the processing of fracking water, from chemical plants, from mills, from fuel ethanol plants, and from lakes, rivers, dams, and surface water drainage systems, and in any other suitable environments or implementations. Embodiments of grit removal systems in accordance with the present disclosure may advantageously reduce the complexity and costs associated with fabricating, operating, and maintaining systems for removing grit in comparison with prior art systems.

For example, in some embodiments, a system for removing grit from a slurry includes a containment vessel, a separation assembly, and a removal assembly. Grit is separated from the slurry by the separation assembly, which allows the grit to settle out of the slurry as the slurry flows through the containment vessel. The separation assembly is configured to enable the grit to be driven by gravity downwardly toward the bottom surface of the containment vessel and into engagement with a separation conveyor. The grit is conveyed by the separation conveyor to a removal conveyor of the removal assembly. The removal conveyor conveys the grit out of containment vessel and out of a grit exit port. An effluent formed by the slurry with at least some of the grit removed is released from an outlet of the containment vessel.

Figure 1:
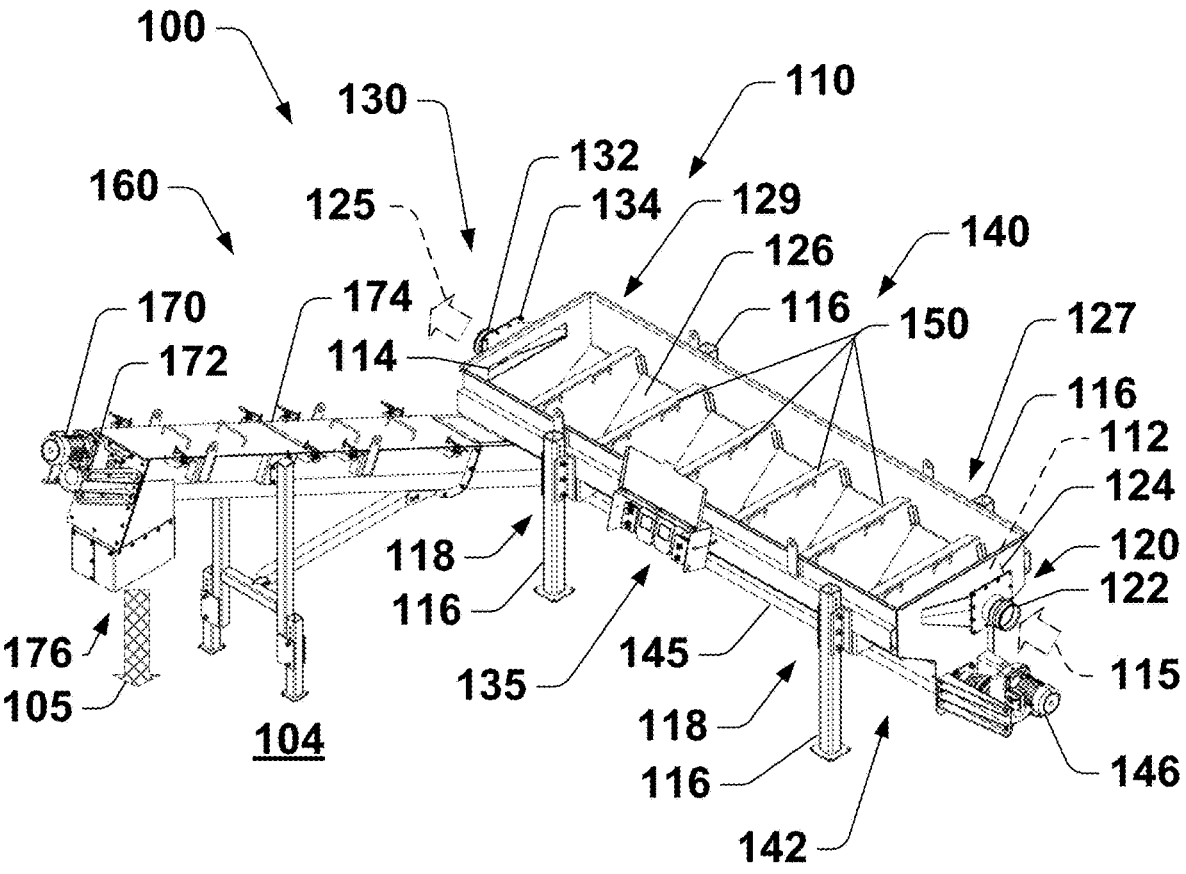
FIG. 1 is a perspective view of a system for grit removal in accordance with an example embodiment.

For example, FIG. 1 is a perspective view of a system 100 for grit removal in accordance with an example embodiment. FIGS. 2-13 show various elevational and cross-sectional views of the system 100 of FIG. 1. In this embodiment, the system 100 includes a containment vessel 110 that receives an inflow stream 115 of a slurry 102 containing grit 105. In some embodiments, containment vessel is an elongated, trough-like vessel. For example, as shown in FIG. 1, the containment vessel 110 may include an inlet 112 through which the inflow stream 115 passes into the containment vessel 110, and an outlet 114 to allow an effluent 125 to be released from the containment vessel 110 after at least some of the grit 105 has been removed. More specifically, in some embodiments, the inflow stream 115 of slurry 102 (depicted as a dashed line in FIGS. 5-6) enters proximate to a first portion (or first end) 127 of the containment vessel 110, and the slurry 102 then flows through the containment vessel 110 to the outlet 114 which is proximate to a second portion (or second end) 129 of the containment vessel 110.

It will be appreciated that the slurry 102 may be any suitable fluidic mixture from which grit 105 is to be removed. For example, in some embodiments, the slurry 102 may be wastewater from a septic system, contaminated water or other fluids from an industrial activity, or any other suitable mixture of fluids and solid debris. In addition, the grit 105 that is removed from the slurry 102 may be particulates, sand, gravel, metals, plastics, or any other suitable materials.

In some embodiments, the containment vessel 110 may include a plurality of legs 116 that support the containment vessel 110 above a support surface 104 (FIG. 4), such as the ground, floor, support pad, truck bed, or other suitable structure. One or more of the legs 116 may, for example, include an adjustment assembly 118 (e.g. one or more pins and a plurality of holes) to enable the lengths of the legs 116 to be independently adjusted as desired.

As further shown in FIGS. 1-4, in some embodiments, the containment vessel 110 includes an inflow manifold assembly 120 that is coupled to the inlet 112 to facilitate the flow of slurry 102 into the containment vessel 110. For example, in this embodiment, the inflow manifold assembly 120 includes a supply pipe 122 that may be operatively coupled to a source of slurry 102 (e.g. a supply truck, a holding tank, a pump, etc.), and an intake transition 124 that couples the supply pipe 122 to the inlet 112. It will be appreciated that the inflow manifold assembly 120 may have a variety of suitable configurations and is not necessarily limited to the particular embodiment shown in the accompanying figures. In alternate embodiments, the inflow manifold assembly 120 may be entirely separate from (or eliminated from) the containment vessel 110.

Similarly, in some embodiments, the containment vessel 110 includes an outflow manifold assembly 130 that is coupled to the outlet 114 to facilitate the flow of the effluent 125 (i.e. the slurry 102 after at least some grit has been removed) out of the containment vessel 110. For example, in the embodiment shown in FIGS. 1-4, the outflow manifold assembly 130 includes an exit pipe 132, and an outlet transition 134 that couples the exit pipe 132 to the outlet 114. Again, it will be appreciated that the outflow manifold assembly 130 may have a variety of suitable configurations and is not necessarily limited to the particular embodiment shown in the accompanying figures. In alternate embodiments, the outflow manifold assembly 130 may be separate from, or eliminated from, the containment vessel 110.

As depicted in FIGS. 1-8, the system 100 further includes a separation assembly 140 at least partially disposed within the containment vessel 110, wherein the separation assembly 140 is configured to separate at least some of the grit 105 from the slurry 102. In some embodiments, the separation assembly 140 includes a separation conveyor 142 that extends along a longitudinal axis 147 from the first portion 127 of the containment vessel 110 to the second portion 129 of the containment vessel 110. In some embodiments, the separation conveyor 142 is configured to convey the grit 105 that is separated from the slurry 102 toward the second portion 129 of the containment vessel 110, as described more fully below.

Figures 4, 5:
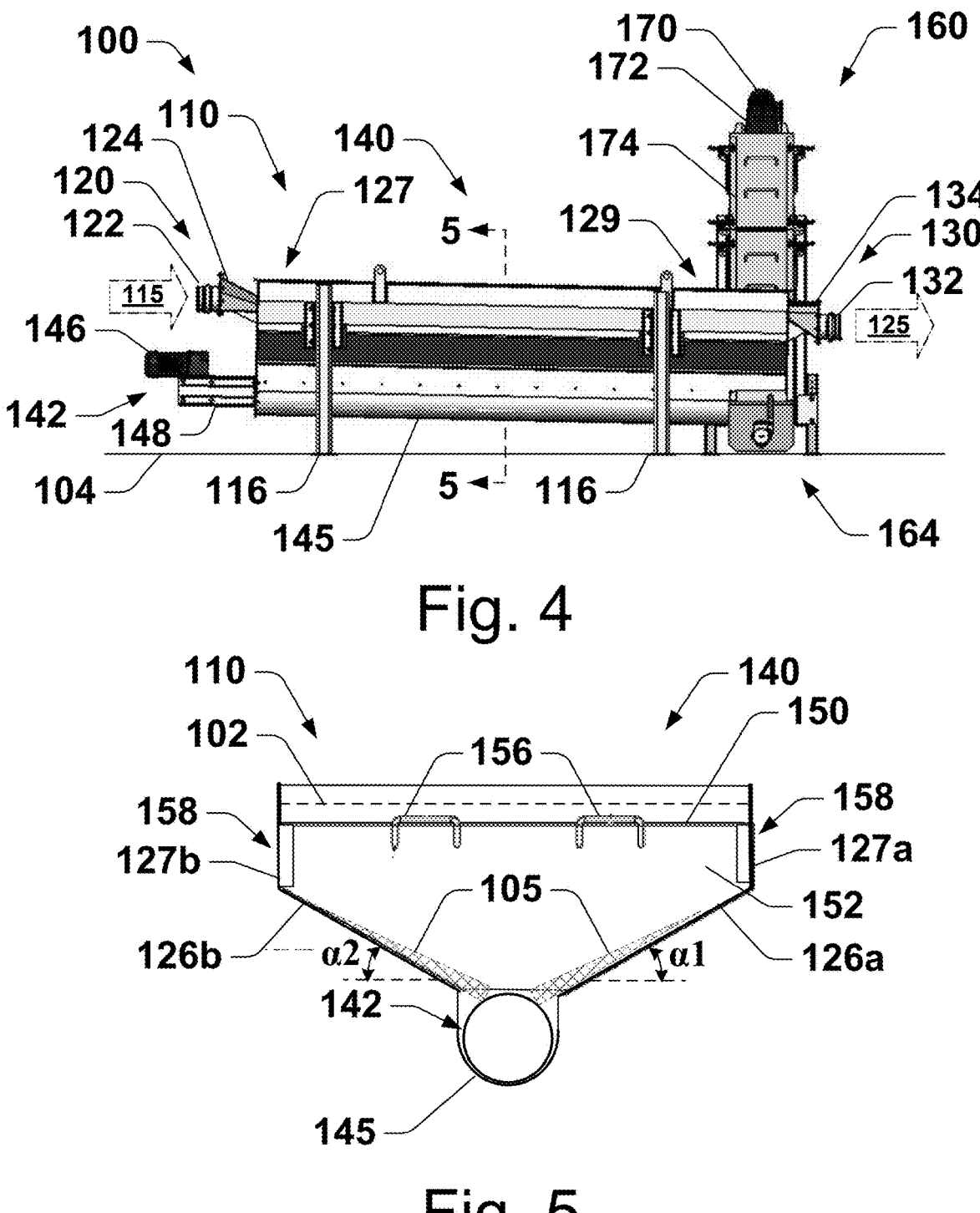
FIG. 4 is a side elevational view of the system of FIG. 1 in accordance with an example embodiment.
FIG. 5 is an end cross-sectional view of a containment vessel of the system of FIG. 1 (taken along line 5-5 of FIG. 4) in accordance with an example embodiment.

FIG. 5 is an end cross-sectional view of the system 100 taken along line 5-5 of FIG. 4. In some embodiments, the containment vessel 110 includes a pair of bottom surfaces 126 that slope downwardly toward the separation conveyor 142 of the separation assembly 140 by inclination angles α1, α2 with respect to horizontal. More specifically, in some embodiments, the first bottom surface 126*a* extends inwardly and downwardly from a first side surface 127*a* of the containment vessel 110, and a second bottom surface 126*b* extends inwardly and downwardly from a second side surface 127*b* of the containment vessel 110, the separation conveyor 142 being disposed between the first and second bottom surfaces 126*a*, 126*b*. For example, in some embodiments, the bottom surfaces 126 may be inclined with respect to horizontal at inclination angles α1, α2 within a range of approximately 20 degrees to approximately 60 degrees. In addition, in particular embodiments, the inclination angles α1, α2 may be approximately 40 degrees with respect to horizontal. Of course, in further embodiments, other suitable inclination angles α1, α2 may be employed.

As further shown in FIG. 5, in some embodiments, the separation assembly 140 includes a separation channel assembly 145 that extends at least partially around the separation conveyor 142 (e.g. extends partially-circumferentially or semi-circumferentially around the separation conveyor 142). Some of the grit 105 that is separated from the slurry 102 may move downwardly along the bottom surfaces 126 and into the separation channel assembly 145. In some embodiments, the separation channel assembly 145 may extend from approximately the first portion 127 of the containment vessel 110 to approximately the second portion 129 of the containment vessel 110. Accordingly, in some embodiments, the separation conveyor 142 may be configured to rotate about the longitudinal axis 147 to convey the grit 105 that is separated from the slurry 102 along the separation channel assembly 145 toward the second portion 129 of the containment vessel 110.

More specifically, in some embodiments, the separation channel assembly 145 may include a wear-resistant plastic liner that is positioned proximate to the separation conveyor 142. For example, in some embodiments, the separation channel assembly 145 includes a one-quarter inch thick liner formed of an ultra-high-molecular-weight (UHMW) plastic. In some specific embodiments, the UHMW liner of the separation channel assembly 145 may be a plastic material commercially-available from the Redwood Plastics and Rubber of Spokane, Washington.

In some embodiments, the separation channel assembly 145 and the separation conveyor 142 may be downwardly inclined at a separation angle θ with respect to horizontal to encourage the conveyance of the grit 105 along the separation channel assembly 145 from the first portion 127 of the containment vessel 110 to the second portion 129 of the containment vessel 110. For example, in some embodiments, the separation channel assembly 145 and the separation conveyor 142 may be downwardly inclined at the separation angle θ within a range of approximately 0.5 degrees to approximately 5 degrees with respect to horizontal. In addition, in particular embodiments, the separation angle θ is approximately 1.15 degrees downward with respect to horizontal. Of course, in further embodiments, other suitable separation angle θ (including zero) may be employed.

It will be appreciated that the separation conveyor 142 of the separation assembly 140 may have a variety of suitable embodiments. For example, in some embodiments, the separation conveyor 142 comprises a shaft-less screw 144 that is driven by a first motor 146 operatively coupled to the shaft-less screw 144 by a first drive assembly 148 to provide a rotational force that rotates the first shaft-less screw 144 of the separation conveyor 142. In other embodiments, however, the separation conveyor 142 may comprise a shafted screw conveyor, an auger, or any other suitable implementation. In some embodiments, the separation conveyor 142 may have a pitch of 6-12 inches between blade peaks of the shaft-less screw 144 at the same radial position, or any other suitable configuration. In some embodiments, a control box 135 positioned on an outer surface of the containment vessel 110 is operatively coupled to the separation assembly 140 to provide control signals to the first drive motor 146 (and to other components) during operation of the system 100.

Figure 2:
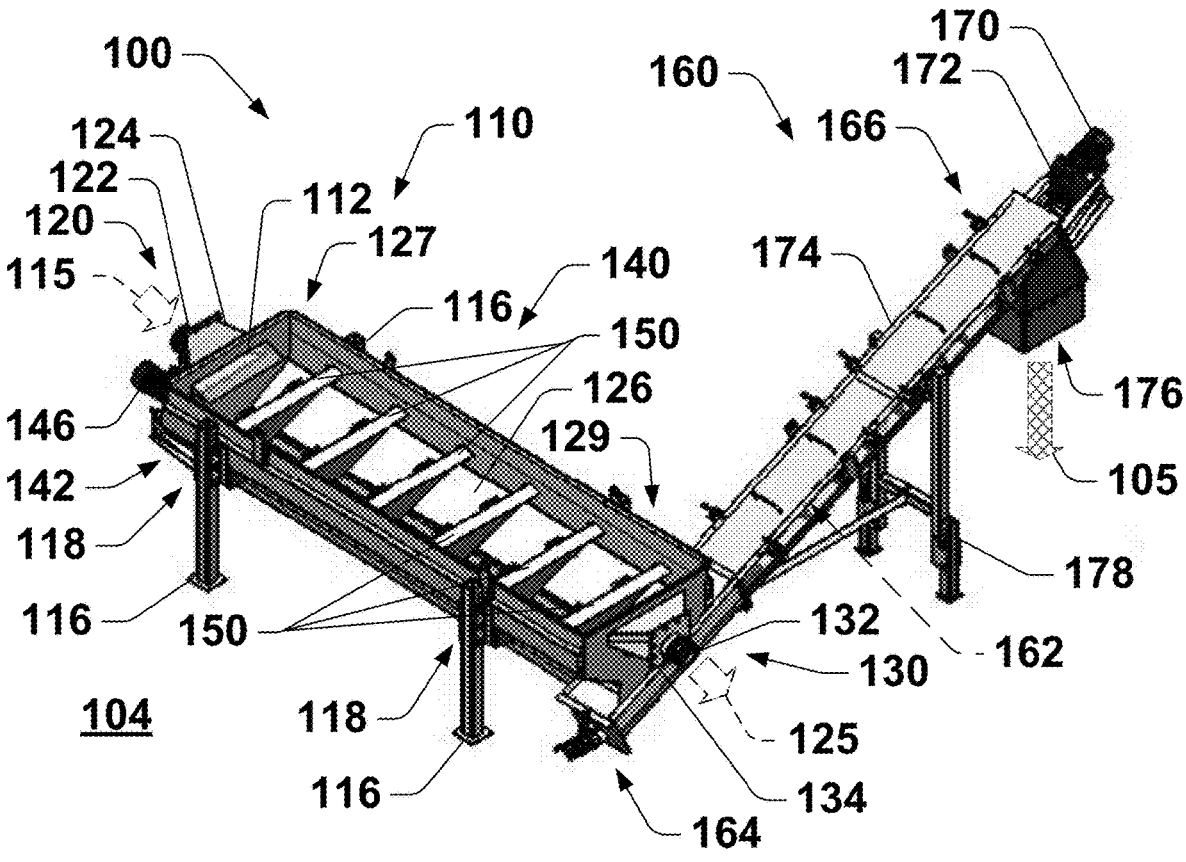
FIG. 2 is another perspective view of the system of FIG. 1 in accordance with an example embodiment.
Figure 3:
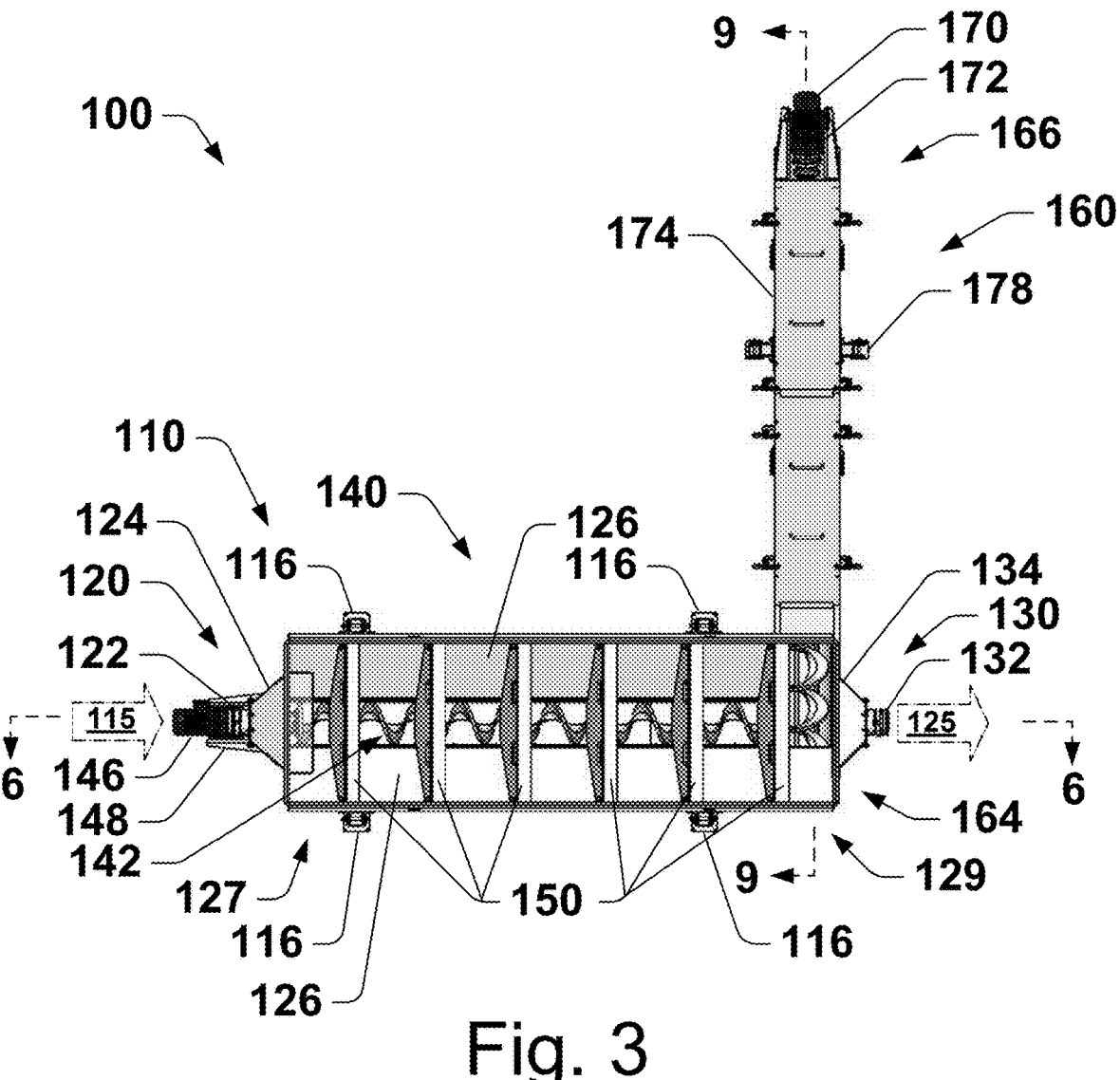
FIG. 3 is a top elevational view of the system of FIG. 1 in accordance with an example embodiment.

With continued reference to FIGS. 1-8, the separation assembly 140 further includes one or more separation ribs 150 positioned within the containment vessel 110 and oriented approximately transversely with respect to the longitudinal axis 145 (see FIG. 6) of the separation conveyor 142. The one or more separation ribs 150 may be positioned within the containment vessel 110 and oriented approximately transversely with respect to a general direction of flow of the slurry 102 from the first portion 127 of the containment vessel 110 to the second portion 129 of the containment vessel 110. As best shown in FIGS. 1-3, in some embodiments, the separation assembly 140 may include six separation ribs 150 positioned within the containment vessel 110, however, in further embodiments, a greater or fewer number of separation ribs 150 may be employed.

FIGS. 7 and 8 are side and front elevational views of one of the separation ribs 150 of the system 100 of FIG. 1 in accordance with an example embodiment. In some embodiments, the separation rib 150 includes a face portion 152 that is contoured to fit within an interior region of the containment vessel 110, and a lip portion 154 that is oriented at an approximately right angle with respect to the face portion 152. As best shown in FIG. 5, in some embodiments, the face portion 152 is configured to occupy a substantial majority of a cross-sectional area of the interior region of the containment vessel 110. The lip portion 154 may be configured to enhance the structural rigidity of the separation rib 150. In some embodiments, the separation rib 150 may further include one or more separation rib handles 156 to facilitate installation and removal of the separation rib 150 from within the containment vessel 110.

Figure 6:
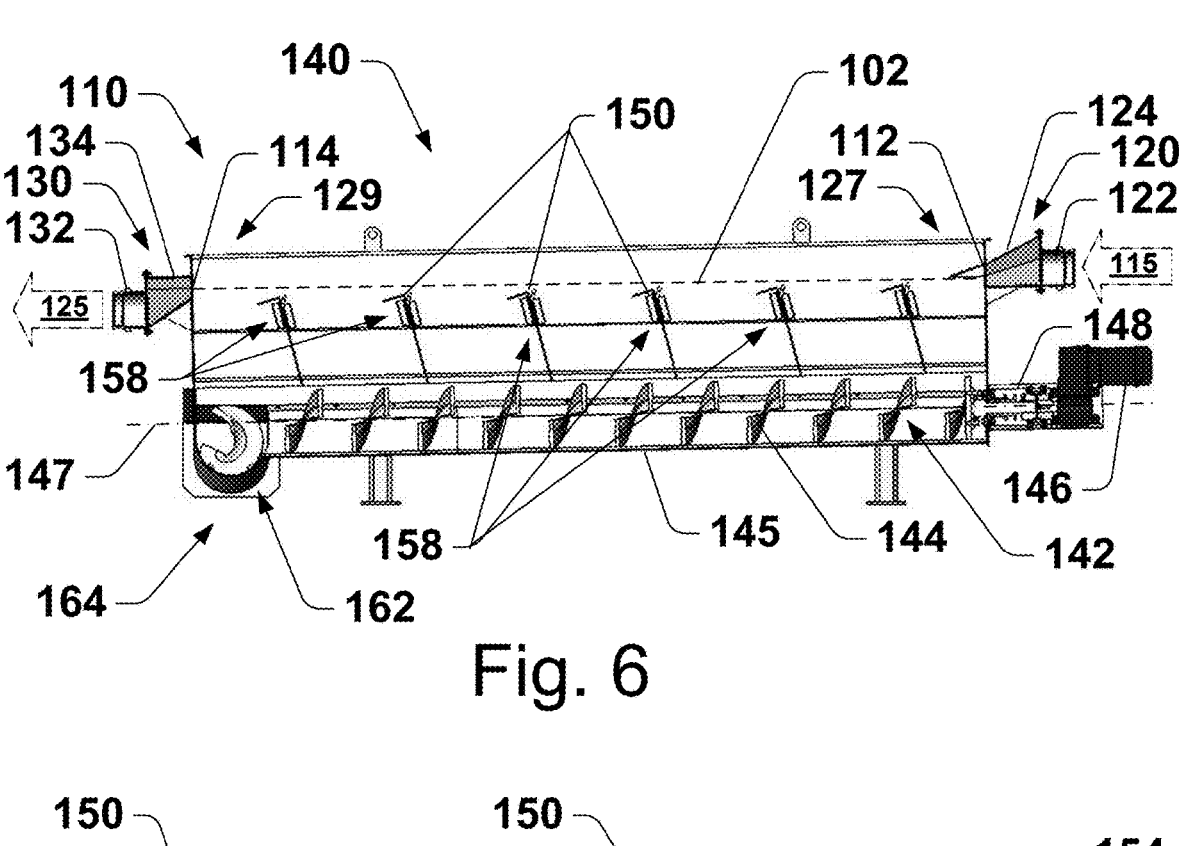
FIG. 6 is a side cross-sectional view of the system of FIG. 1 (taken along line 6-6 of FIG. 3) in accordance with an example embodiment.

In some embodiments, one or more of the separation ribs 150 may be removably coupled to the containment vessel 110 to enable each separation rib 150 to be installed and removed as desired according to the operating conditions of the system 100. For example, as best shown in FIGS. 5-6, in some embodiments, the containment vessel 110 may include one or more mounting slots 158 that are configured to slidably receive the face portion 152 of each separation rib 150, enabling each separation rib 150 to be removably installed within the interior region of the containment vessel 110. Of course, in further embodiments, the one or more separation ribs 150 may be permanently installed within containment vessel 110, or some of the separation ribs 150 may be removably installed while other of the separation ribs 150 may be permanently installed.

As further shown in FIGS. 1-8, in some embodiments, the one or more separation ribs 150 may be installed within the containment vessel 110 such that the face portion 152 of each separation rib 150 is oriented in a non-vertical position. As best shown in FIGS. 6 and 7, in some embodiments, each separation rib 150 may be attached to the containment vessel 110 such that the face portion 152 is tilted by a tilt angle β toward the second portion 129 (or the outlet 114) of the containment vessel 110. More specifically, in some embodiments, each separation rib 150 may be attached to the containment vessel 110 such that the face portion 152 is tilted at the tilt angle β toward the second portion 129 with respect to vertical, where the tilt angle β is within a range of approximately 5 degrees to approximately 45 degrees. In particular embodiments, the tilt angle β is approximately 15 degrees with respect to vertical. Of course, in further embodiments, other suitable tilt angles β may be employed, including zero degrees (i.e. vertical).

Figures 9, 10, 11:
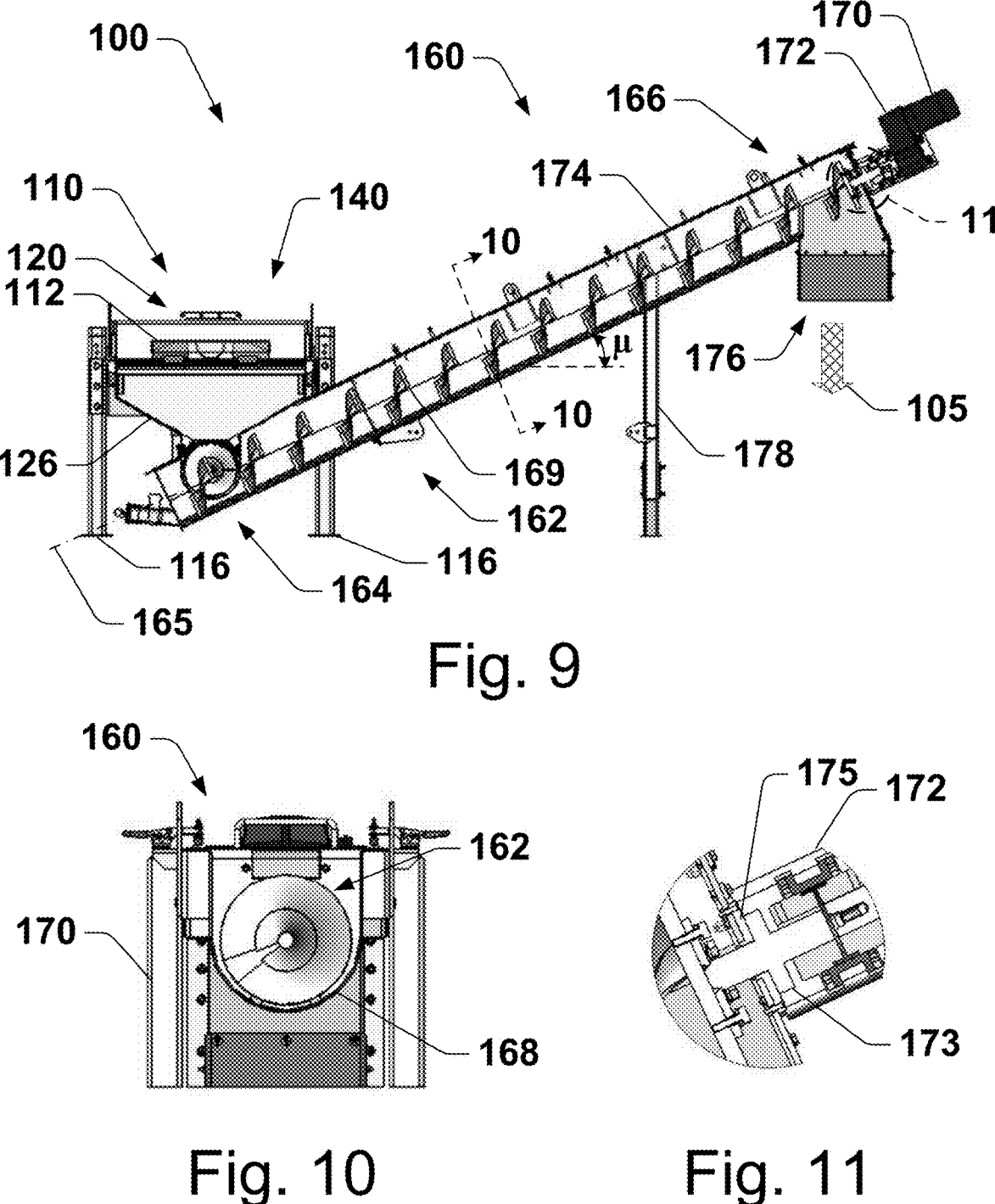
FIG. 9 is a side cross-sectional view of the system of FIG. 1 (taken along line 9-9 of FIG. 3) in accordance with an example embodiment.
FIG. 10 is an enlarged cross-sectional view of a removal assembly of the system of FIG. 1 (taken along line 10-10 of FIG. 9) in accordance with an example embodiment.
FIG. 11 is enlarged cross-sectional view of a portion of a second drive assembly of the system of FIG. 1 (see Detail 11 of FIG. 9) in accordance with an example embodiment.

As best shown in FIGS. 2 and 9, in some embodiments, the system 100 further includes a removal assembly 160 that is configured to remove the grit 105 from the containment vessel 110 after it is separated from the slurry 102. In some embodiments, the removal assembly 160 includes a removal conveyor 162 that extends along a second longitudinal axis 165 from a lower portion (or lower end) 164 that is disposed proximate to the second portion 129 of the containment vessel 110, and extends outwardly from the containment vessel 110 and upwardly at a removal angle μ with respect to horizontal to an upper portion 166. In some embodiments, the removal conveyor 162 is configured to convey the grit 105 that is separated from the slurry 102 toward the upper portion 166 of the removal conveyor 162.

FIG. 10 is an enlarged cross-sectional view of the removal assembly 160 taken along line 10-10 of FIG. 9. As shown in FIG. 10, in some embodiments, the removal assembly 160 further includes a removal chute 168 that extends at least partially around the removal conveyor 162 (e.g. extends partially-circumferentially or semi-circumferentially around the removal conveyor 162). In some embodiments, the removal chute 168 may extend from approximately the lower portion 164 of the removal conveyor 162 to approximately the upper portion 166 of the removal conveyor 162.

It may be noted that the removal conveyor 162 of the removal assembly 160 may have a variety of suitable embodiments. For example, in some embodiments, the removal conveyor 162 comprises a second shaft-less screw 169 that is driven by a second motor 170 operatively coupled to the second shaft-less screw 169 by a second drive assembly 172 to provide a rotational force that rotates the second shaft-less screw 169 of the removal conveyor 162. In other embodiments, however, the removal conveyor 162 may comprise a shafted screw conveyor, or an auger, or any other suitable implementation. Similar to the separation conveyor 142 described above, in some embodiments, the removal conveyor 162 may have a pitch of 6-12 inches between blade peaks of the second shaft-less screw 169 at the same radial position, or any other suitable configuration. And in some embodiments, the control box 135 positioned on an outer surface of the containment vessel 110 is operatively coupled to the removal assembly 160 to provide control signals to the second drive motor 170 during operation of the system 100.

Figure 14:
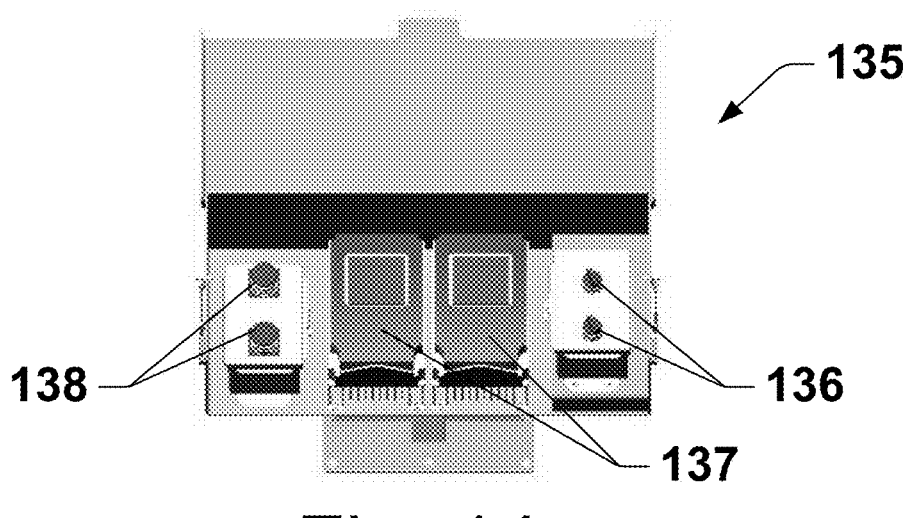
FIG. 14 is a front elevational view of a control box of FIG. 1 in accordance with an example embodiment.

More specifically, FIG. 14 is a front elevational view of the control box 135 of FIG. 1 in accordance with an example embodiment. In this embodiment, the control box 135 includes one or more power switches 136 for starting (and stopping) the first and second drive motors 146, 170. For example, the control box 135 shown in FIG. 14 includes two power switches 136, each power switch 136 controlling the supply of power to one of the first and second drive motors 146, 170. Similarly, in some embodiments, the control box 135 may also include one or more variable frequency drives (VFDs) 137 for controlling the speed of the first and second drive motors 146, 170. For example, the control box 135 shown in FIG. 14 includes two VFDs 137, each VFD 137 being configured to control a speed of one of the first and second drive motors 146, 170. In addition, in some embodiments, the control box 135 may also include one or more emergency shut-off buttons 138 for stopping the first and second drive motors 146, 170. For example, the control box 135 shown in FIG. 14 includes two emergency shut-off buttons 138, each emergency shut-off button 138 being configured to halt the supply of power to one of the first and second drive motors 146, 170. Of course, other embodiments of control box 135 may suitably be employed.

As further shown in FIGS. 9-10, in some embodiments, the removal assembly 160 further includes a housing 174 that surrounds and protects at least part of the removal conveyor 162 and the removal chute 168. The housing 174 may include a grit exit port 176 disposed proximate to the upper portion 166 of the removal conveyor 162. A support 178 may be coupled to the housing 174 to provide structural support to maintain the housing 174 and the removal conveyor 162 at the removal angle μ. Accordingly, in some embodiments, the removal conveyor 162 may be configured to rotate about the second longitudinal axis 165 to convey the grit 105 that is separated from the slurry 102 along the removal chute 168 toward the upper portion 166 of the removal conveyor 162 and to discharge the grit 105 from the grit exit port 176.

In some embodiments, the removal angle μ of the removal conveyor 162 (and the housing 174) may be within a range of approximately 5 degrees to approximately 60 degrees. In particular embodiments, the removal angle μ may be approximately 20 degrees. Of course, in other embodiments, any other suitable values of removal angle μ may be employed.

It will be appreciated that the first and second drive motors 146, 170 and the first and second drive assemblies 148, 172 may have a variety of suitable configurations. For example, in some embodiments, the first and second drive motors 146, 170 may be electric motors. In further embodiments, however, the first and second drive motors 146, 170 may include a combustion engine, a pump or hydraulically-driven component, a pneumatically-driven component, or any suitable combination of components. In some particular embodiments, the first and second drive motors 146, 170 and the first and second drive assemblies 148, 178 may include a 3 HP Nord gear reduction drive with Lenze VFD Control that accomplishes a variable rotational speed with variable control from 6-28 RPMs. In addition, as shown in FIG. 11, in some embodiments, the second drive assembly 178 may include a flanged drive shaft 173 that engages with a thrust bearing 175. In some embodiments, the thrust bearing 175 may be an ultra-high-molecular-weight (UHMW) thrust bearing that provides improves durability and self-lubricating operating characteristics.

Figures 12, 13:
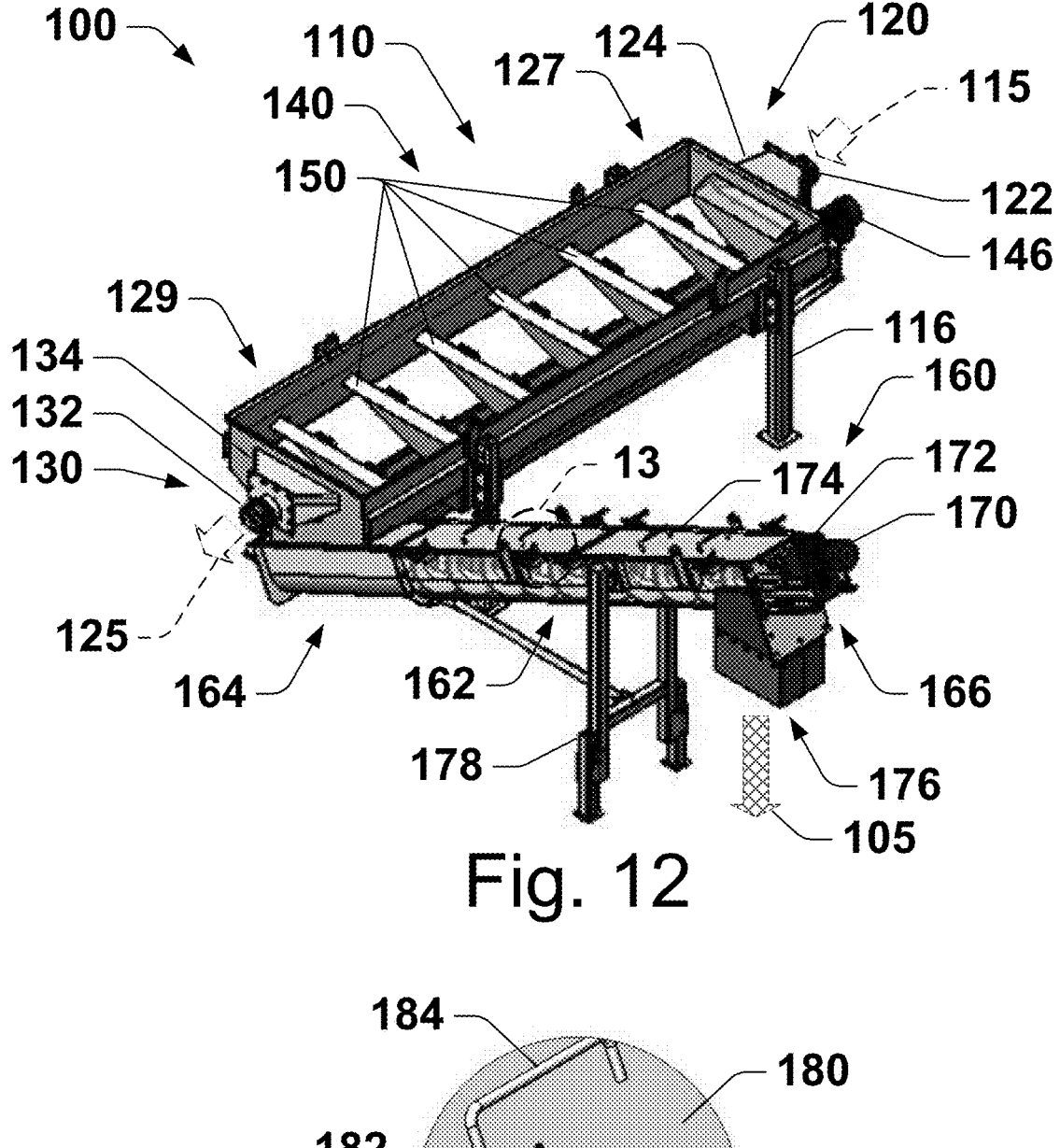
FIG. 12 is a perspective, partially-sectional view of the system of FIG. 1 in accordance with an example embodiment.
FIG. 13 is enlarged perspective view of a portion of a removal chute of the system of FIG. 1 (see Detail 13 of FIG. 12) in accordance with an example embodiment.

It may also be appreciated that the housing 174 may have a variety of suitable configurations. For example, in some embodiments, the housing 174 may include one or more removable panels 180 that enable access to the removal conveyor 163 for performing repairs, inspections, maintenance, or other desired activities. As shown in FIG. 13, in some embodiments, each removable panel 180 may be secured in position by one or more releasable clamps 182. In some embodiments, each removable panel 180 may include one or more panel handles 184 that facilitate installation and removal of the removable panel 180.

In operation, as the inflow stream 115 of slurry 102 is introduced into the containment vessel 110 of the system 100 (e.g. using the inflow manifold assembly 120 or other suitable apparatus), the first drive motor 146 is actuated (e.g. using the control box 135) to cause the separation conveyor 142 to rotate within the separation channel assembly 145 of the separation assembly 140. Similarly, the second drive motor 170 is actuated to cause the removal conveyor 162 to rotate within the removal chute 168 of the removal assembly 160. Initially, as the slurry 102 enters the containment vessel 110 from the inflow manifold assembly 120, the velocity of the slurry 102 decreases substantially as the flow enters the containment vessel 110 because the cross-sectional area of the containment vessel 110 is substantially larger than the cross-sectional area of the inflow manifold assembly 120. Then, as the slurry 102 begins flowing from the first portion 127 of the containment vessel 110 toward the second portion 129 of the containment vessel 110, the slurry 102 encounters the one or more separation ribs 150 that may further impede or slow the velocity of the slurry 102. Accordingly, the grit 105 within the slurry 102 begins to settle out of the slurry 105 and falls downwardly within the containment vessel 110. Some of the grit 105 falls directly into the separation channel assembly 145, while some of the grit 105 falls onto and moves downwardly along the sloping bottom surfaces 126 of the containment vessel 110. Similarly, some of the grit 105 falls onto and moves downwardly along the tilted face portions 152 of the one or more separation ribs 150. The grit 105 that is separated from the slurry 102 within the containment vessel 110 collects within the separation channel assembly 145 and is conveyed by the separation conveyor 142 toward the second portion 129 of the containment vessel 110.

Because the lower portion 164 of the removal conveyor 162 is disposed proximate to and below the second portion 129 of the containment vessel 110, the grit 105 conveyed by the separation conveyor 142 is conveyed into the removal chute 168 of the removal assembly 160. The grit 105 is then conveyed upwardly within the removal chute 168 by the removal conveyor 162, from the lower portion 164 of the removal conveyor 162 to the upper portion 166 of the removal conveyor 162, and eventually, the grit 105 is discharged from the grit exit port 176 of the housing 174. As the grit 105 is expelled from the removal assembly 160 through the grit exit port 176, the grit 105 may be collected for proper disposal (e.g. by truck, dumpster, rail car, etc.).

Meanwhile, the effluent 125 formed by removing the grit 105 from the slurry 102 passes out of the outlet 114 of the containment vessel 110 (e.g. via the outflow manifold assembly 130) and is discharged from the system 100.

Figure 15:
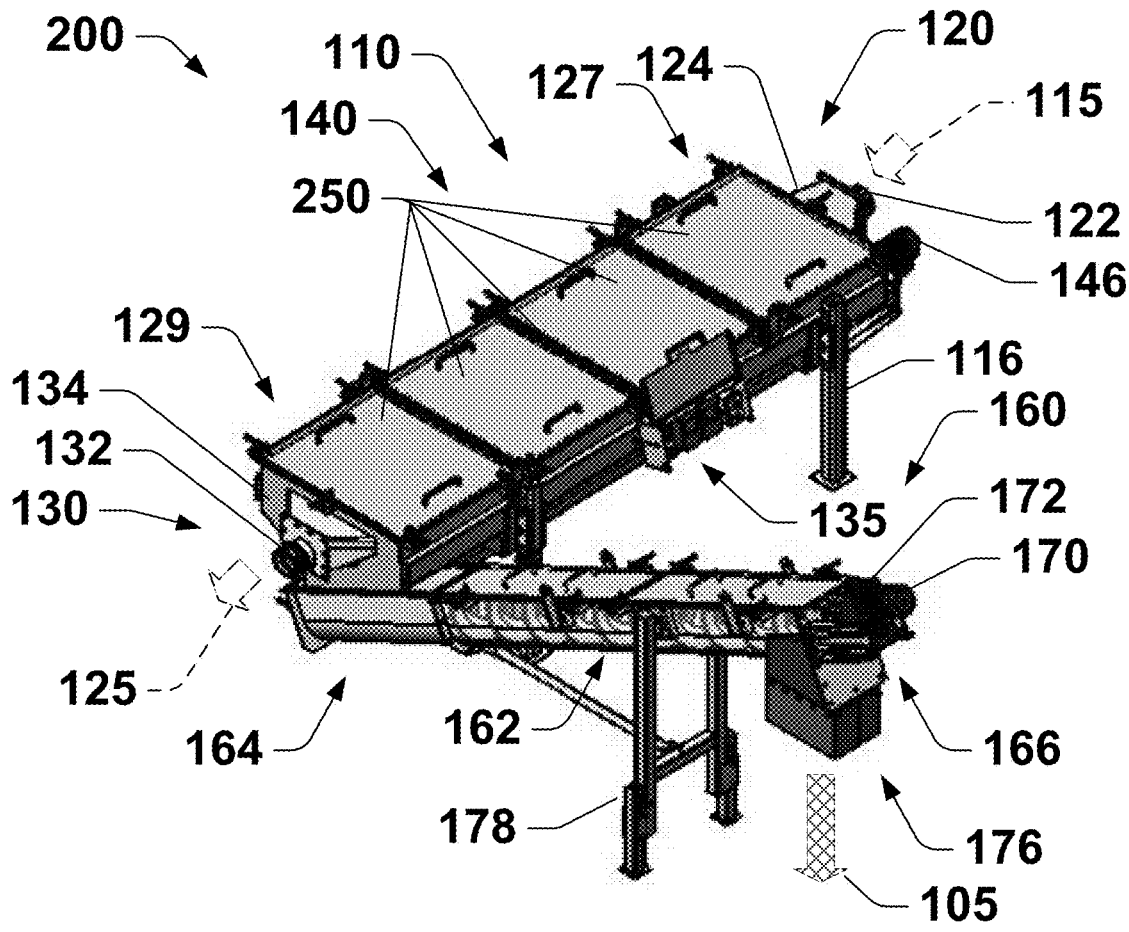
FIG. 15 is a perspective, partially-sectional view of a system for grit removal in accordance with another example embodiment.

It will be appreciated that a variety of alternate embodiments of systems for grit removal may be conceived, and that the present disclosure is not limited to the particular embodiments described above and shown in the accompanying figures. For example, in various alternate embodiments, at least some of the one or more of the components of the above-described systems may be modified or eliminated, or additional components may be added. For example, FIG. 15 is a perspective, partially-sectional view of a system 200 for grit removal in accordance with another example embodiment. It will be appreciated that many (or most) of the structural and operational aspects of the system 200 are the same as those described above with respect to the system 100 shown in FIGS. 1-14, and therefore, for the sake of brevity, a detailed description of all of the structural and operational aspects of this alternate embodiment will not be repeated.

As shown in FIG. 15, in some embodiments, the system 200 includes a plurality of covers 250 that fit over an upper opening of the containment vessel 110. For example, in the embodiment shown in FIG. 15, there are four covers 250 that fit over the upper opening of the containment vessel 110. In some embodiments, one or more of the covers 250 are removable to provide access to the interior region of the containment vessel 110, such as to remove or install the separation ribs 150, or to access or service the separation conveyor 142, or for any other suitable purpose. The covers 250 on the containment vessel 110 may perform a variety of functions, such as reducing the possibility of emitted odor, or splashing of the slurry 102, or the unintentional entry of foreign debris into the containment vessel 110.

In the embodiments shown in FIGS. 1-15, the removal assembly 160 is disposed at a right angle with respect to the separation assembly 140. More specifically, the second longitudinal axis 165 of the removal assembly 160 extends outwardly to the left at an approximately 90 degree angle with respect to the first longitudinal axis 147 of the separation assembly 140 (when viewed from the top and left is with respect to the flow-wise direction along the first longitudinal axis 147). It will be appreciated, however, that in alternate embodiments, the removal assembly 160 may extend outwardly from the separation assembly 140 at a wide variety of suitable angles and orientations. For example, in some alternate embodiments, the second longitudinal axis 165 of the removal assembly 160 extends outwardly to the right at an approximately 90 degree angle with respect to the first longitudinal axis 147 of the separation assembly 140 (when viewed from the top and right is with respect to the flow-wise direction along the first longitudinal axis 147). In other words, in alternate embodiments, the system could be configured as a mirror image of the system 100, 200 shown in FIGS. 1-15. Of course, in still further alternate embodiments, the removal assembly 160 may extend outwardly from the separation assembly 140 at any other suitable angle or orientation.

Embodiments of systems for grit removal in accordance with the present disclosure may provide considerable advantages. For example, it will be appreciated that by proper selection of various design parameters of the system 100 (e.g. inclination angles α1, α2, the tilt angle β, number and size of separation ribs 150, etc.), the grit 105 may be removed from the slurry 102 without the need for mechanical stirring devices that create vortices in the slurry to separate the grit 105 using centrifugal forces. Accordingly, systems in accordance with the present disclosure may advantageously perform the desired grit-removal functionality while eliminating one or more mechanical devices that are used by prior art systems. In this way, embodiments of grit removal systems in accordance with the present disclosure may advantageously reduce the complexity and costs associated with fabricating, operating, and maintaining systems for removing grit in comparison with prior art systems.

Accordingly, in some embodiments, a system for removing grit from a slurry, comprises: a containment vessel, a separation assembly, and a removal assembly. In some embodiments, the separation assembly is configured to receive the slurry proximate a first portion thereof and having an outlet proximate a second portion thereof, the containment vessel having at least one bottom surface extending from the first portion to the second portion and being downwardly inclined at an inclination angle with respect to horizontal such that a grit that settles from the slurry moves downwardly along the at least one bottom surface; a separation assembly operatively coupled to the containment vessel.

In some embodiments, the separation assembly includes: a separation conveyor having a first longitudinal axis extending from the first portion to the second portion, and a separation channel assembly at least partially disposed about the separation conveyor, the separation channel assembly being positioned to receive the grit that moves downwardly along the at least one bottom surface, the separation conveyor being configured to convey the grit in the separation channel assembly toward the second portion of the containment vessel and out of an end of the separation channel assembly; and one or more separation ribs positioned within the containment vessel and oriented approximately transversely to the first longitudinal axis of the separation conveyor, the one or more separation ribs being configured to slow a velocity of the slurry as the slurry traverses from the first portion to the second portion to encourage the grit within the slurry to settle out of the slurry toward the separation channel assembly for conveyance by the separation screw conveyor toward the second portion.

In some embodiments, the removal assembly operatively coupled to the containment vessel and to the separation assembly, the removal assembly having a lower portion and an upper portion having a grit exit port, the removal assembly including: a removal conveyor having a second longitudinal axis extending from the lower portion to the upper portion, and a removal chute at least partially disposed about the removal conveyor, the removal chute being positioned to receive the grit that is conveyed by the separation conveyor out of the end of the separation channel assembly, the removal conveyor being configured to convey the grit received by the removal chute toward the upper portion of the removal assembly and out of the grit exit port.

In some embodiments, the inclination angle of the at least one bottom surface of the containment vessel is within a range of approximately 20 degrees to approximately 60 degrees with respect to horizontal. Moreover, in some embodiments, the at least one bottom surface comprises a first bottom surface extending inwardly and downwardly from a first side surface of the containment vessel, and a second bottom surface extending inwardly and downwardly from a second side surface of the containment vessel, the separation conveyor being disposed between the first and second bottom surfaces.

In some embodiments, the separation assembly is configured to enable the grit to be driven by gravity downwardly toward the bottom surface of the containment vessel and into engagement with the separation conveyor. And in some embodiments, the first longitudinal axis of the separation conveyor is downwardly inclined at a separation angle within a range of approximately 0.5 degrees to approximately 5 degrees with respect to horizontal.

In some embodiments, the one or more separation ribs include a plurality of separation ribs. And in some embodiments, the one or more separation ribs include at least one removable separation rib slidably coupled to the containment vessel. In further embodiments, the one or more separation ribs include at least one separation rib having a face portion contoured to fit within an interior region of the containment vessel and being configured to occupy a substantial majority of a cross-sectional area of the interior region of the containment vessel. And in some embodiments, the one or more separation ribs include at least one separation rib having a face portion configured to occupy a substantial majority of a cross-sectional area of an interior region of the containment vessel, the face portion being oriented at a non-vertical position. For example, in some particular embodiments, the face portion is oriented at a tilt angle toward the second position, the tilt angle being within a range of approximately 5 degrees to approximately 45 degrees respect to vertical.

In some embodiments, the second longitudinal axis is disposed at a removal angle within a range of approximately 20 degrees to approximately 60 degrees. And in some embodiments, at least one of the separation conveyor or the removal conveyor comprises at least one of a shaft-less screw conveyor, a shafted screw conveyor, or an auger.

And in further embodiments, a system for removing grit from a slurry, comprises: a containment vessel configured to receive the slurry proximate a first portion thereof and having an outlet proximate a second portion thereof, the containment vessel having first and second bottom surfaces extending from the first portion to the second portion, the first bottom surface extending inwardly and downwardly from a first side surface of the containment vessel, and the second bottom surface extending inwardly and downwardly from a second side surface of the containment vessel, and the first and second bottom surfaces being downwardly inclined with respect to horizontal such that a grit that settles from the slurry moves downwardly along the first and second bottom surfaces; a separation assembly operatively coupled to the containment vessel, the separation assembly including: a separation conveyor having a first longitudinal axis extending from the first portion to the second portion, and a separation channel assembly at least partially disposed about the separation conveyor, the separation channel assembly being positioned to receive the grit that moves downwardly along the first and second bottom surfaces, the separation conveyor being configured to convey the grit in the separation channel assembly toward the second portion of the containment vessel and out of an end of the separation channel assembly; and one or more separation ribs positioned within the containment vessel and oriented approximately transversely to the first longitudinal axis of the separation conveyor, the one or more separation ribs being configured to slow a velocity of the slurry as the slurry traverses from the first portion to the second portion to encourage the grit within the slurry to settle out of the slurry toward the separation channel assembly for conveyance by the separation screw conveyor toward the second portion; and a removal assembly operatively coupled to the containment vessel and to the separation assembly, the removal assembly having a lower portion and an upper portion having a grit exit port, the removal assembly including: a removal conveyor having a second longitudinal axis extending from the lower portion to the upper portion, and a removal chute at least partially disposed about the removal conveyor, the removal chute being positioned to receive the grit that is conveyed by the separation conveyor out of the end of the separation channel assembly, the removal conveyor being configured to convey the grit received by the removal chute toward the upper portion of the removal assembly and out of the grit exit port.

In addition, in some embodiments the first and second bottom surfaces of the containment vessel are downwardly inclined within a range of approximately 20 degrees to approximately 60 degrees with respect to horizontal. In some embodiments, the separation assembly is configured to enable the grit to be driven by gravity downwardly toward the bottom surface of the containment vessel and into engagement with the separation screw conveyor.

In further embodiments, the one or more separation ribs include a plurality of separation ribs, each separation rib being slidably coupled to the containment vessel. And in some embodiments, the one or more separation ribs include at least one separation rib having a face portion contoured to fit within an interior region of the containment vessel and being configured to occupy a substantial majority of a cross-sectional area of the interior region of the containment vessel, the face portion being oriented at a non-vertical position. In particular embodiments, the face portion is oriented at a tilt angle toward the second position, the tilt angle being within a range of approximately 5 degrees to approximately 45 degrees respect to vertical.

And in some embodiments, the second longitudinal axis is disposed at a removal angle within a range of approximately 20 degrees to approximately 60 degrees. In further embodiments, at least one of the separation conveyor or the removal conveyor comprises at least one of a shaft-less screw conveyor, a shafted screw conveyor, or an auger.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A system for removing grit from a slurry, comprising:
a containment vessel configured to receive the slurry proximate a first portion thereof and having an outlet proximate a second portion thereof, the containment vessel having at least one bottom surface extending from the first portion to the second portion and being downwardly inclined at an inclination angle with respect to horizontal such that a grit that settles from the slurry moves downwardly along the at least one bottom surface;
a separation assembly operatively coupled to the containment vessel, the separation assembly including:
a separation channel assembly operatively coupled to the at least one bottom surface and extending from the first portion to the second portion, the separation channel assembly being positioned to receive the grit that moves downwardly along the at least one bottom surface, and
a separation conveyor at least partially disposed within the separation channel assembly and having a first longitudinal axis extending from the first portion to the second portion, the first longitudinal axis being downwardly sloping with respect to the horizontal from the first portion to the second portion, the separation conveyor being configured to convey the grit along the separation channel assembly toward the second portion of the containment vessel and out of an end of the separation channel assembly; and
one or more separation ribs positioned within the containment vessel and oriented approximately transversely to the first longitudinal axis of the separation conveyor, the one or more separation ribs being configured to slow a velocity of the slurry as the slurry traverses from the first portion to the second portion to encourage the grit within the slurry to settle out of the slurry toward the separation channel assembly for conveyance by the separation conveyor along the separation channel assembly toward the second portion; and
a removal assembly operatively coupled to the containment vessel and to the separation assembly, the removal assembly having a lower portion and an upper portion having a grit exit port, the removal assembly including:
a removal conveyor having a second longitudinal axis extending from the lower portion to the upper portion, and a removal chute at least partially disposed about the removal conveyor, the removal chute being positioned to receive the grit that is conveyed by the separation conveyor out of the end of the separation channel assembly, the removal conveyor being configured to convey the grit received by the removal chute toward the upper portion of the removal assembly and out of the grit exit port.

2. The system of claim 1, wherein the inclination angle of the at least one bottom surface of the containment vessel is within a range of approximately 20 degrees to approximately 60 degrees with respect to horizontal.

3. The system of claim 1, wherein the at least one bottom surface comprises a first bottom surface extending inwardly and downwardly from a first side surface of the containment vessel, and a second bottom surface extending inwardly and downwardly from a second side surface of the containment vessel, the separation conveyor being disposed between the first and second bottom surfaces, the first and second bottom surfaces extending inwardly and downwardly by first and second inclination angles from the first and second side surfaces, respectively, to the separation channel assembly.

4. The system of claim 1, wherein the at least one bottom surface of the containment vessel extends longitudinally along a length of the containment vessel from the first portion to the second portion of the containment vessel, and wherein the at least one bottom surface extends transversely from a side surface of the containment vessel and is downwardly inclined at the inclination angle in the transverse direction such that the at least one bottom surface extends from the side surface of the containment vessel to the separation channel of the separation assembly, the at least one bottom surface being inclined to enable the grit to be driven by gravity downwardly toward the bottom surface of the containment vessel and into engagement with the separation conveyor.

5. The system of claim 1, wherein the first longitudinal axis of the separation conveyor is downwardly inclined at a separation angle within a range of approximately 0.5 degrees to approximately 5 degrees with respect to horizontal.

6. The system of claim 1, wherein the one or more separation ribs include a plurality of separation ribs, each separation rib including a substantially-planar face portion that is contoured to fit within an interior region of the containment vessel and configured to occupy a substantial majority of a cross-sectional area of the interior region of the containment vessel, the substantially-planar face portion being oriented at a tilt angle with respect to vertical.

7. The system of claim 1, wherein the one or more separation ribs include at least one removable separation rib slidably coupled to the containment vessel.

8. The system of claim 1, wherein the one or more separation ribs include at least one separation rib having a face portion contoured to fit within an interior region of the containment vessel and being configured to occupy a substantial majority of a cross-sectional area of the interior region of the containment vessel.

9. The system of claim 1, wherein the one or more separation ribs include at least one separation rib having a face portion configured to occupy a substantial majority of a cross-sectional area of an interior region of the containment vessel, the face portion being oriented at a non-vertical position.

10. The system of claim 9, wherein the face portion being oriented at a tilt angle toward the second position, the tilt angle being within a range of approximately 5 degrees to approximately 45 degrees respect to vertical.

11. The system of claim 1, wherein the second longitudinal axis is disposed at a removal angle within a range of approximately 20 degrees to approximately 60 degrees.

12. The system of claim 1, wherein at least one of the separation conveyor or the removal conveyor comprises at least one of a shaft-less screw conveyor, a shafted screw conveyor, or an auger.

13. A system for removing grit from a slurry, comprising:
a containment vessel configured to receive the slurry proximate a first portion thereof and having an outlet proximate a second portion thereof, the containment vessel having first and second bottom surfaces extending from the first portion to the second portion, the first bottom surface extending inwardly and downwardly from a first side surface of the containment vessel, and the second bottom surface extending inwardly and downwardly from a second side surface of the containment vessel, and the first and second bottom surfaces being downwardly inclined with respect to horizontal such that a grit that settles from the slurry moves downwardly along the first and second bottom surfaces;
a separation assembly operatively coupled to the containment vessel, the separation assembly including:
a separation channel assembly operatively coupled to the at least one bottom surface and extending from the first portion to the second portion, the separation channel assembly being positioned to receive the grit that moves downwardly along the first and second bottom surfaces, and
a separation conveyor at least partially disposed within the separation channel assembly and having a first longitudinal axis extending from the first portion to the second portion, the first longitudinal axis being downwardly sloping with respect to the horizontal from the first portion to the second portion, the separation channel assembly being positioned to receive the grit that moves downwardly along the first and second bottom surfaces, the separation conveyor being configured to convey the grit in the separation channel assembly toward the second portion of the containment vessel and out of an end of the separation channel assembly; and
one or more separation ribs positioned within the containment vessel and oriented approximately transversely to the first longitudinal axis of the separation conveyor, the one or more separation ribs being configured to slow a velocity of the slurry as the slurry traverses from the first portion to the second portion to encourage the grit within the slurry to settle out of the slurry toward the separation channel assembly for conveyance by the separation conveyor along the separation channel assembly toward the second portion; and
a removal assembly operatively coupled to the containment vessel and to the separation assembly, the removal assembly having a lower portion and an upper portion having a grit exit port, the removal assembly including:
a removal conveyor having a second longitudinal axis extending from the lower portion to the upper portion, and a removal chute at least partially disposed about the removal conveyor, the removal chute being positioned to receive the grit that is conveyed by the separation conveyor out of the end of the separation channel assembly, the removal conveyor being configured to convey the grit received by the removal chute toward the upper portion of the removal assembly and out of the grit exit port.

14. The system of claim 13, wherein first and second bottom surfaces of the containment vessel are downwardly inclined within a range of approximately 20 degrees to approximately 60 degrees with respect to horizontal.

15. The system of claim 13, wherein the separation assembly is configured to enable the grit to be driven by gravity downwardly toward the bottom surface of the containment vessel and into engagement with the separation conveyor.

16. The system of claim 13, wherein the one or more separation ribs include a plurality of separation ribs, each separation rib being slidably coupled to the containment vessel.

17. The system of claim 13, wherein the one or more separation ribs include at least one separation rib having a face portion contoured to fit within an interior region of the containment vessel and being configured to occupy a substantial majority of a cross-sectional area of the interior region of the containment vessel, the face portion being oriented at a non-vertical position.

18. The system of claim 17, wherein the face portion being oriented at a tilt angle toward the second position, the tilt angle being within a range of approximately 5 degrees to approximately 45 degrees respect to vertical.

19. The system of claim 13, wherein the second longitudinal axis is disposed at a removal angle within a range of approximately 20 degrees to approximately 60 degrees.

20. The system of claim 13, wherein at least one of the separation conveyor or the removal conveyor comprises at least one of a shaft-less screw conveyor, a shafted screw conveyor, or an auger.

* * * * *